United States Patent
Lee et al.

(10) Patent No.: US 8,284,849 B2
(45) Date of Patent: *Oct. 9, 2012

(54) PHASE SHIFT BASED PRECODING METHOD AND TRANSCEIVER FOR SUPPORTING THE SAME

(75) Inventors: Moon Il Lee, Yongin-si (KR); Jae Won Chang, Suwon-si (KR); Bin Chul Ihm, Anyang-si (KR); Jin Hyuk Jung, Ansan-si (KR); Jin Young Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 304 days.

This patent is subject to a terminal disclaimer.

(21) Appl. No.: 12/561,197

(22) Filed: Sep. 16, 2009

(65) Prior Publication Data

US 2010/0074309 A1    Mar. 25, 2010

Related U.S. Application Data

(63) Continuation of application No. 11/754,882, filed on May 29, 2007.

(60) Provisional application No. 60/803,340, filed on May 26, 2006, provisional application No. 60/889,891, filed on Feb. 14, 2007, provisional application No. 60/894,665, filed on Mar. 13, 2007.

(30) Foreign Application Priority Data

Apr. 16, 2007   (KR) ........................ 10-2007-0037008

(51) Int. Cl.
*H04K 1/10*       (2006.01)

(52) U.S. Cl. ........ 375/260; 375/267; 375/295; 375/299; 375/347; 455/101; 455/132; 455/141

(58) Field of Classification Search .......... 375/259–260, 375/265–267, 285, 295, 299, 358, 347; 370/210; 455/101, 132, 141

See application file for complete search history.

(56) References Cited

U.S. PATENT DOCUMENTS 6,298,092 B1    10/2001    Heath, Jr. et al.

(Continued)

FOREIGN PATENT DOCUMENTS

EP          1087545         3/2001

(Continued)

OTHER PUBLICATIONS

R1-062566, 3GPP TSG RAN WG1 Meeting #46bis, Oct. 9-13, 2006, LG Electronics, pp. 1-9.*

(Continued)

*Primary Examiner* — Sam K Ahn
*Assistant Examiner* — Sophia Vlahos
(74) *Attorney, Agent, or Firm* — Lee, Hong, Degerman, Kang & Waimey

(57) ABSTRACT

A method of transmitting data using a generalized phase shift based precoding or an extended phase shift precoding scheme in a multiple-antenna system using a plurality of subcarrier and a transceiver for supporting the same are disclosed. A phase shift based precoding matrix may be generalized and determined by a product of a diagonal matrix for phase shift and a unitary matrix for maintaining orthogonality in spatial domain. The diagonal matrix may be extended by a product of a precoding matrix for increasing channel power and the diagonal matrix for phase shift. The design of the transceiver can be simplified or communication efficiency can be improved by generalizing and extending the phase shift based precoding.

11 Claims, 6 Drawing Sheets

U.S. PATENT DOCUMENTS

| | | | |
|---|---|---|---|
| 6,760,882 B1 | 7/2004 | Gesbert et al. | |
| 6,891,897 B1 | 5/2005 | Bevan et al. | |
| 7,583,747 B1 * | 9/2009 | Damen et al. | 375/267 |
| 7,583,982 B2 | 9/2009 | Olesen et al. | |
| 7,609,613 B2 | 10/2009 | Aghvami et al. | |
| 7,620,019 B1 | 11/2009 | Smith et al. | |
| 7,636,297 B1 | 12/2009 | Lee et al. | |
| 7,702,029 B2 | 4/2010 | Kotecha et al. | |
| 7,729,432 B2 | 6/2010 | Khan et al. | |
| 7,813,330 B2 | 10/2010 | Yu et al. | |
| 7,839,944 B2 * | 11/2010 | Lee et al. | 375/267 |
| 7,885,349 B2 * | 2/2011 | Lee et al. | 375/267 |
| 7,899,132 B2 * | 3/2011 | Lee et al. | 375/295 |
| 2003/0048753 A1 | 3/2003 | Jalali | |
| 2003/0147343 A1 | 8/2003 | Onggosanusi et al. | |
| 2004/0192218 A1 | 9/2004 | Oprea | |
| 2005/0041751 A1 | 2/2005 | Nir et al. | |
| 2005/0201307 A1 | 9/2005 | Chae et al. | |
| 2005/0281350 A1 | 12/2005 | Chae et al. | |
| 2006/0013186 A1 | 1/2006 | Agrawal et al. | |
| 2006/0013328 A1 | 1/2006 | Zhang et al. | |
| 2006/0039489 A1 | 2/2006 | Ikram et al. | |
| 2006/0039500 A1 | 2/2006 | Yun et al. | |
| 2006/0067277 A1 | 3/2006 | Thomas et al. | |
| 2006/0067443 A1 | 3/2006 | Liu et al. | |
| 2006/0093062 A1 | 5/2006 | Yun et al. | |
| 2006/0098568 A1 | 5/2006 | Oh et al. | |
| 2006/0098760 A1 | 5/2006 | Shen et al. | |
| 2006/0140294 A1 | 6/2006 | Hottinen et al. | |
| 2006/0146692 A1 | 7/2006 | Gorokhov et al. | |
| 2006/0270360 A1 | 11/2006 | Han et al. | |
| 2007/0041457 A1 * | 2/2007 | Kadous et al. | 375/260 |
| 2007/0041464 A1 * | 2/2007 | Kim et al. | 375/267 |
| 2007/0097856 A1 * | 5/2007 | Wang et al. | 370/210 |
| 2007/0133707 A1 | 6/2007 | Hwang et al. | |
| 2007/0147543 A1 | 6/2007 | Horng et al. | |
| 2007/0149180 A1 | 6/2007 | Lin et al. | |
| 2007/0165738 A1 | 7/2007 | Barriac et al. | |
| 2007/0189416 A1 | 8/2007 | Kim | |
| 2007/0263746 A1 | 11/2007 | Son | |
| 2007/0280373 A1 | 12/2007 | Lee et al. | |
| 2007/0286302 A1 | 12/2007 | Hwang et al. | |
| 2007/0291638 A1 | 12/2007 | Chae et al. | |
| 2007/0297529 A1 | 12/2007 | Zhou et al. | |
| 2008/0063115 A1 | 3/2008 | Varadarajan et al. | |
| 2008/0069031 A1 | 3/2008 | Zhang et al. | |
| 2008/0080637 A1 | 4/2008 | Khan et al. | |
| 2008/0108310 A1 | 5/2008 | Tong et al. | |
| 2008/0198946 A1 | 8/2008 | Lee et al. | |
| 2008/0205533 A1 | 8/2008 | Lee et al. | |
| 2008/0232503 A1 | 9/2008 | Kim | |
| 2008/0240274 A1 | 10/2008 | Han et al. | |
| 2008/0247364 A1 | 10/2008 | Kim et al. | |
| 2008/0256163 A1 | 10/2008 | Clerckx et al. | |
| 2008/0303699 A1 | 12/2008 | Zhang et al. | |
| 2009/0003466 A1 | 1/2009 | Taherzadehboroujeni et al. | |
| 2009/0003485 A1 | 1/2009 | Li et al. | |
| 2009/0110114 A1 | 4/2009 | Onggosanusi et al. | |
| 2009/0296844 A1 | 12/2009 | Ihm et al. | |
| 2009/0316807 A1 | 12/2009 | Kim et al. | |
| 2010/0027696 A1 | 2/2010 | Lee et al. | |
| 2010/0074309 A1 | 3/2010 | Lee et al. | |
| 2010/0118997 A1 | 5/2010 | Lee et al. | |
| 2011/0150129 A1 | 6/2011 | Kwon et al. | |

FOREIGN PATENT DOCUMENTS

| | | |
|---|---|---|
| EP | 1538772 | 6/2005 |
| EP | 1655874 | 5/2006 |
| JP | 2003018127 | 1/2003 |
| JP | 2005509316 | 4/2005 |
| JP | 2006-222742 | 8/2006 |
| JP | 2007195129 | 8/2007 |
| JP | 2008510417 | 4/2008 |
| JP | 2008528102 | 7/2008 |
| JP | 2009516942 | 4/2009 |
| JP | 2009538555 | 11/2009 |
| JP | 2009538556 | 11/2009 |
| KR | 10-2006-0028989 | 4/2006 |
| KR | 10-2006-0038812 | 5/2006 |
| KR | 10-2006-0064501 | 6/2006 |
| KR | 10-2006-0130062 | 12/2006 |
| KR | 10-0715582 | 4/2007 |
| KR | 1020070068300 | 6/2007 |
| KR | 10-2008-0036499 | 4/2008 |
| KR | 10-0918747 | 9/2009 |
| RU | 2238611 | 10/2004 |
| RU | 2005-101422 | 8/2005 |
| RU | 2351071 | 1/2006 |
| RU | 2292116 | 1/2007 |
| TW | 589818 | 6/2004 |
| TW | 200611519 | 4/2006 |
| WO | 02/39590 | 5/2002 |
| WO | 2004-038952 | 5/2004 |
| WO | 2004064311 | 7/2004 |
| WO | 2004073224 | 8/2004 |
| WO | 2005/099211 | 10/2005 |
| WO | 2005-122516 | 12/2005 |
| WO | 2005/125044 | 12/2005 |
| WO | 2006002550 | 1/2006 |
| WO | 2006/019250 | 2/2006 |
| WO | 2006/019253 | 2/2006 |
| WO | 2006049417 | 5/2006 |
| WO | 2006/069271 | 6/2006 |
| WO | 2007/024935 | 3/2007 |
| WO | 2007094832 | 8/2007 |

OTHER PUBLICATIONS

R1-071601, 3GPP TSG RAN WG1 # 48bis, Mar. 26-30, 2007, Ericsson, pp. 1-7.*

Zhang, J., "MIMO Wireless Precoding System Robust to Power Imbalance," U.S. Appl. No. 60/929,025, filed Jun. 8, 2007.

Athaudage, C.R.N., et al.; "An Efficient Framework to Exploit Frequency Diversity in OFDM: Precoding With Adaptive Subcarrier Selection"; The 17th Annual IEEE Int'l Symposium on Personal, Indoor, Mobile Radio Communications; Sep. 11, 2006.

Wang, J., et al.; "Method and Apparatus for Pre-Coding"; U.S. Appl. No. 60/731,301, filed Oct. 28, 2005.

NTT Docomo, 'Multi-Degree Cyclic Delay Diversity with Frequency-Domain Channel Dependent Scheduling', R1-062107, 3GPP TSG RAN WG1 Meeting #46, Aug. 28, 2006.

Samsung, Further details on adaptive cyclic delay diversity scheme, R1-051046, 3GPP TSG RAN WG1 Meeting #42bis, Oct. 10, 2005.

Samsung, 'System performance of adaptive cyclic delay diversity scheme', R1-051047, 3GPP TSG RAN WG1 Meeting #42bis, Oct. 10, 2005.

NTT Docomo, 'Multi-Degree Cyclic Delay Diversity with Frequency-domain Channel Dependent Scheduling', R1-060991, 3GPP TSG RAN WG1 Meeting #44bis, Mar. 26, 2006.

NTT Docomo, 'Channel Dependent Scheduling with Cyclic Delay Diversity', R1-061192, 3GPP TSG RAN WG1 Meeting #45, May 8, 2006.

Ericsson, 'Phase Shift based Precoding for Downlink MIMO Transmission', R1-071032, 3GPP TSG RAN WG1 #48, Feb. 12, 2007.

NTT Docomo, 'CDD-Based Pre-coding Scheme for Rank=1 and 2', R1-062732, 3GPP TSG RAN WG1 Meeting #46bis, Oct. 9, 2006.

LG Electronics, 'Generalized CDD scheme for E-UTRA downlink MIMO', R1-062314, 3GPP TSG RAN WG1 Meeting #46, Aug. 28, 2006.

LG Electronics, et al., 'CDD-based Precoding for E-UTRA downlink MIMO', R1-063345, 3GPP TSG RAN WG1 Meeting #47, Nov. 6, 2006.

LG Electronics, et al., 'CDD-based Precoding for Open-loop E-UTRA downlink MIMO', R1-063346, 3GPP TSG RAN WG1 Meeting #47, Nov. 6, 2006.

ETRI, 'Combined spatial multiplexing and CSD transmission for rate 2 with 4 transmit antennas', R1-060828, 3GPP TSG RAN WG1 Meeting #44bis, Mar. 27, 2006.

Ludovic, C. et al.; "Optimal Minimum Distance-Based Precoder for MIMO Spatial Multiplexing Systems"; IEEE Transactions on Signal Processing; Mar. 2004; vol. 52, No. 3 pp. 617-627; XP011107796.

Chan S. et al.; Asymptotically Minimum BER Linear Block Precoders for MMSE Equalisation; IEEE Proceedings: Communications; Aug. 21, 2004, Journal Article, vol. 151, No. 4, pp. 297-304; XP0006022313.

Bauch et al., "Orthogonal Frequency Division Multiple Access with Cycile Delay Diversity", IEEE ITG Workshop on Smart Antennas, pp. 17-24, Mar. 2004.

Chen et al., "Precoded FIR and Redundant V-BLAST Systems for Frequency-Selective MIMO Channels", IEEE Transactions on Signal Processing, vol. 55, No. 7, p. 3390-3404, Jul. 2007.

Lee et al., "A New Transmit Diversity Scheme based on Cyclic Precoding Vectors for Flat Fading Channels", p. 2238-2242, 2007.

S. Sun et al., "Precoding for Asymmetric MIMO-OFDM Channels", IEEE International Conference on Communications, vol. 7, pp. 3117-3122, Jun. 2006.

NTT Docomo: "Multi-Degree Cyclic Delay Diversity with Frequency-domain Channel Dependent Scheduling", R1-062107, 3GPP TSG RAN WG1 Meeting #46, Aug. 2006.

Nortel, "Closed-Loop MIMO Pre-coding and Feedback Design", R1-060659, 3GPP TSG-RAN Working Group 1 Meeting #44, Feb. 2006.

* cited by examiner

-- Prior Art --

-- Prior Art --

PHASE SHIFT BASED PRECODING METHOD AND TRANSCEIVER FOR SUPPORTING THE SAME

CROSS-REFERENCE TO RELATED APPLICATIONS

This application is a continuation of U.S. application Ser. No. 11/754,882, filed May 29, 2007, currently pending, which pursuant to 35 U.S.C. §119(a) claims the benefit of earlier filing date and right to priority to Korean Patent Application No. 10-2007-0037008, filed on Apr. 16, 2007, and also claims the benefit of U.S. Provisional Application Ser. Nos. 60/803,340, filed on May 26, 2006, 60/889,891, filed on Feb. 14, 2007, and 60/894,665, filed on Mar 13, 2007, all of which are hereby incorporated by reference as if fully set forth herein in their entireties.

This application also claims the benefit of U.S. Provisional Application Ser. Nos. 60/803,340, filed on May 26, 2006, 60/889,891, filed on Feb. 14, 2007, and 60/894,665, filed on Mar. 13, 2007, the contents of which are hereby incorporated by reference herein in their entirety.

BACKGROUND OF THE INVENTION

1. Field of the Invention

The present invention relates to a generalized phase shift based precoding method or an extended phase shift based precoding method in a multiple-antenna system using a plurality of subcarriers and a transceiver for supporting the same.

2. Discussion of the Related Art

Recently, as information communication services have been popularized, a variety of multimedia services has appeared, and high-quality services have appeared, a requirement for a wireless communication service is rapidly increasing. In order to actively cope with such a tendency, a method of increasing communication capacity in a wireless communication environment may include a method of finding a new available frequency band and a method of increasing the efficiency of a restricted resource. As the latter method, multiple-antenna transmission/reception technologies of mounting a plurality of antennas in a transmitter/receiver and further ensuring a space for using a resource to obtain a diversity gain or transmitting data via the antennas in parallel to increase transmission capacity are attracting much attention and are being actively developed.

Among the multiple-antenna transmission/reception technologies, the general structure of a multiple-input multiple-output system using an orthogonal frequency division multiplexing (OFDM) will now be described with reference to FIG. 1.

In a transmitter, a channel encoder 101 adds redundancy bits to transmission data bits to reduce influence due to a channel or noise, a mapper 103 converts data bit information into data symbol information, a serial/parallel converter 105 converts data symbols into parallel data symbols to be carried in a plurality of subcarriers, and a multiple-antenna encoder 107 converts the parallel data symbols into space-time signals. A multiple-antenna decoder 109, a parallel/serial converter 111, a demapper 113, and a channel decoder 115 included in a receiver perform the inverse functions of the multiple-antenna encoder 107, the serial/parallel converter 105, the mapper 103, and the channel encoder 101, respectively.

In a multiple-antenna OFMD system, a variety of technologies of increasing data transmission reliability is required. Among them, a scheme for increasing the spatial diversity gain includes a space-time code (STC) and a cyclic delay diversity (CDD) and a scheme for increasing a signal-to-noise ratio (SNR) includes a beamforming (BF) and a Precoding.

The STC and the CDD are used to increase the transmission reliability of an open loop system in which a transmitter cannot use feedback information, and the BF and the Precoding are used to maximize the SNR using feedback information in a closed loop system in which a transmitter can use the feedback information.

Among these schemes, the scheme for increasing the spatial diversity gain and the scheme for increasing the SNR, and more particularly, the CDD and the Precoding, will now be described.

In the CDD, a system having a plurality of transmission antennas transmits OFDM signals having different delays or different levels via all the antennas such that a receiver obtains a frequency diversity gain. FIG. 2 shows the configuration of a multiple-antenna system using the CDD.

The OFDM symbols are divided and transmitted to the antennas through the serial/parallel converter and the multiple-antenna encoder, and are added to a cyclic prefix (CP) for preventing inter-channel interference to be transmitted to the receiver. Where, a data sequence sent to a first antenna is transmitted to the receiver without change, and a data sequence sent to a next antenna is cyclic-delayed from the sequence sent to the previous antenna by predetermined bits and is then transmitted to the receiver.

Meanwhile, if the CDD is implemented in a frequency domain, the cyclic delay may be expressed by a product of phase sequences. That is, as shown in FIG. 3, data sequences in the frequency domain are multiplied by predetermined different phase sequences (phase sequence 1 to phase sequence M) according to the antennas, and are subjected to an inverse fast Fourier transform (IFFT), thereby being transmitted to the receiver. This is called a phase shift diversity.

If the phase shift diversity is used, it is possible to change a flat fading channel to a frequency-selective channel and to obtain a frequency diversity gain through a channel code or to obtain a multiple-user diversity gain through frequency-selective scheduling.

Meanwhile, the Precoding includes a codebook based precoding which is used when feedback information is finite in a closed loop system and a scheme for quantizing and feeding back channel information. Among them, in the codebook based precoding, the index of a precoding matrix which is previously known to a transmitter/receiver is transmitted to the transmitter as s feedback information to obtain a SNR gain.

FIG. 4 shows the configuration of the transmitter/receiver of a multiple-antenna system using the codebook based precoding. The transmitter and the receiver have finite precoding matrixes $P_1$ to $P_L$. The receiver feeds back an optimal precoding matrix index 1 using channel information and the transmitter applies a precoding matrix corresponding to the feedback index to transmission data $X_1$ to $X_{Mt}$. Table 1 shows an example of the codebook which is applicable when 3-bit feedback information is used in an IEEE 802.16e system which supports a spatial multiplexing rate of 2 and has two transmission antennas.

TABLE 1

| Matrix index (binary) | Column1 | Column2 |
|---|---|---|
| 000 | 1<br>0 | 0<br>1 |
| 001 | 0.7940<br>−0.5801 + j0.1818 | −0.5801 − j0.1818<br>−0.7940 |
| 010 | 0.7940<br>0.0576 + j0.6051 | 0.0576 − j0.6051<br>−0.7940 |
| 011 | 0.7941<br>−0.2978 − j0.5298 | −0.2978 + j0.5298<br>−0.7941 |

TABLE 1-continued

| Matrix index (binary) | Column1 | Column2 |
|---|---|---|
| 100 | 0.7941<br>0.6038 + j0.0689 | 0.6038 − j0.0689<br>−0.7941 |
| 101 | 0.3289<br>0.6614 + j0.6740 | 0.6614 − j0.6740<br>−0.3289 |
| 110 | 0.5112<br>0.4754 − j0.7160 | 0.4754 + j0.7160<br>−0.5112 |
| 111 | 0.3289<br>−0.8779 − j0.3481 | −0.8779 + j0.3481<br>−0.3289 |

The phase shift diversity (PSD) is attracting much attention because a frequency-selective diversity gain can be obtained in an open loop system and a frequency-selective scheduling gain can be obtained in a closed loop system in addition to the above-described advantages. However, since a spatial multiplexing rate is 1, a high data transmission rate cannot be obtained. In addition, when resource allocation is fixed, it is difficult to obtain the above-described gains.

In addition, since the above-described codebook based precoding can use a high spatial multiplexing rate while requiring a small amount of feedback information (index information), it is possible to efficiently transmit data. However, since a stable channel for feedback should be ensured, the codebook based precoding is not suitable for an environment, in which channel variation is excessive, and is applicable to only a closed loop system.

SUMMARY OF THE INVENTION

The present invention is directed to a phase shift based precoding method and a transceiver that substantially obviate one or more problems due to limitations and disadvantages of the related art.

An object of the present invention is to provide a phase shift based precoding method capable of solving the disadvantages of a conventional CDD, a phase shift diversity, and a precoding scheme and to variously applying a phase shift based precoding method to generalize or extend a phase shift based precoding matrix.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data using a phase shift based precoding in a multiple-antenna system using a plurality of subcarriers includes selecting a precoding matrix from a codebook as a part of a phase shift based precoding matrix; determining a diagonal matrix for phase shift as a part of the phase shift based precoding matrix; determining a unitary matrix as a part of the phase shift based precoding matrix; and multiplying a product of the precoding matrix, the diagonal matrix, and the unitary matrix by a symbol of a corresponding subcarrier to perform precoding.

In another aspect of the present invention, a transceiver for transmitting data and performing a phase shift based precoding in a multiple-antenna system using a plurality of subcarriers includes a precoding matrix determining module selecting a precoding matrix from a first codebook as a part of a phase shift based precoding matrix, determining a diagonal matrix for phase shift as a part of the phase shift based precoding matrix, selecting a unitary matrix from a second codebook as a part of the phase shift based precoding matrix, and obtaining a product of the precoding matrix, the diagonal matrix, and the unitary matrix to determine the phase shift based precoding matrix; and a precoding module multiplying the determined phase shift based precoding matrix by a symbol of a corresponding subcarrier.

In another aspect of the present invention, a method of transmitting data using a phase shift based precoding in a multiple-antenna system using a plurality of subcarriers includes determining a diagonal matrix for phase shift as a part of a phase shift based precoding matrix; selecting a unitary matrix from a codebook as a part of the phase shift based precoding matrix; and multiplying a product of the diagonal matrix and the unitary matrix by a symbol of a corresponding subcarrier to perform precoding. The phase shift based precoding matrix according to the product of the unitary matrix and the diagonal matrix includes columns having an identical phase.

In another aspect of the present invention, a method of transmitting data using a phase shift based precoding in a multiple-antenna system using a plurality of subcarriers includes determining first and second diagonal matrixes for phase shift as a part of a phase shift based precoding matrix; selecting a unitary matrix from a codebook as a part of the phase shift based precoding matrix; and multiplying a product of the first diagonal matrix, the unitary matrix, and the second diagonal matrix by a symbol of a corresponding subcarrier to perform precoding.

In the aspects of the present invention, the unitary matrix may be selected by modulo-operating (MOD) an index k of the corresponding subcarrier with the size N of the codebook.

In the aspects of the present invention, at least one of the precoding matrix, the diagonal matrix (including the first diagonal matrix and the second diagonal matrix), and the unitary matrix may be time-varying.

In the aspects of the present invention, at least one of the precoding matrix and the unitary matrix may be selected on the basis of feedback information from a receiver. Where, the feedback information may contain a matrix index for at least one of the codebook.

It can be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Embodiment 1

Phase Shift Based Precoding Matrix

Figure 5:
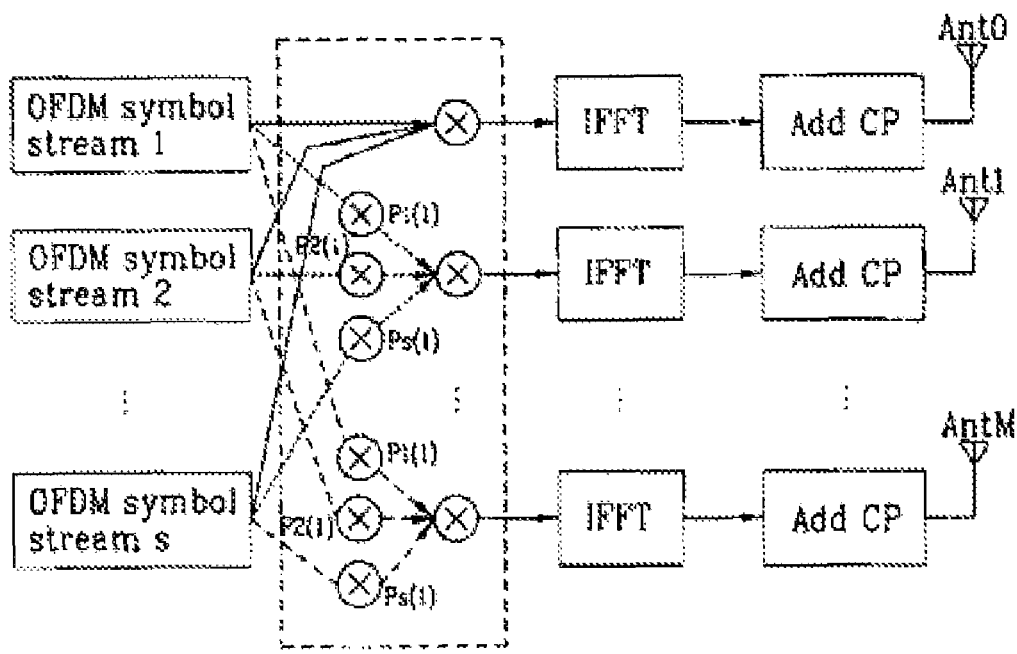
FIG. 5 is a block diagram showing the main configuration of a transmitter/receiver for performing a phase shift based precoding.

FIG. 5 is a block diagram showing the main configuration of a transceiver for performing a phase shift based precoding.

In the phase shift based precoding, all streams to be transmitted are via all antennas. And the streams are multiplied by different phase sequences. In general, when the phase sequence is generated using a small cyclic delay, a channel value increases or decreases according to a frequency domain while frequency selectivity occurs in the channel from the viewpoint of a receiver.

As shown in FIG. 5, a transmitter allocates a user terminal to a high frequency for stabilizing a channel state in a frequency band which fluctuates depending on a relatively small cyclic delay. Where, a phase shift based precoding matrix is used to apply a cyclic delay, which constantly increases or decreases, to each antenna.

The phase shift based precoding matrix P may be expressed by Equation 1.

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} \quad \text{Equation 1}$$

Where, k denotes an index of a subcarrier or an index of a specific frequency band, and $w_{ij}^k$ (i=1, ..., $N_t$, j=1, ..., R) denotes a complex weighted value determined by k. In addition, $N_t$ denotes the number of transmission (physical or virtual) antennas and R denotes a spatial multiplexing rate. The complex weighted value may vary depending on the index of the subcarrier and a specific frequency band which is multiplied by each antenna. The complex weighted value may be determined by at least one of a channel state and the existence of feedback information.

Meanwhile, the precoding matrix P of Equation 1 is preferably designed by a unitary matrix in order to reduce the loss of channel capacity in a multiple-antenna system. In order to check a condition for configuring the unitary matrix, the channel capacity of a multiple-antenna open loop system is expressed by Equation 2.

$$C_u(H) = \log_2\left(\det\left(I_{N_r} + \frac{SNR}{N}HH^H\right)\right) \quad \text{Equation 2}$$

where, H denotes an $N_r \times N_t$ multiple-antenna channel matrix and $N_r$ denotes the number of reception antennas. Equation 3 is obtained by applying the phase shift based precoding matrix P to Equation 2.

$$C_{precoding} = \log_2\left(\det\left(I_{N_r} + \frac{SNR}{N}HPP^H H^H\right)\right) \quad \text{Equation 3}$$

As can be seen from Equation 3, in order to avoid the loss of the channel capacity, $PP^H$ should become an identity matrix. Accordingly, the phase shift based precoding matrix P should satisfy Equation 4.

$$PP^H = I_N \quad \text{Equation 4}$$

In order to allow the phase shift based precoding matrix P to become the unitary matrix, two types of conditions, that is, a power constraint and an orthogonality constraint, should be simultaneously satisfied. The power constraint allows the level of each column of the matrix to become 1 and the orthogonality constraint allows the columns of the matrix to have orthogonal characteristics. These are expressed by Equations 5 and 6.

$$|w_{1,1}^k|^2 + |w_{2,1}^k|^2 + \ldots + |w_{N_t,1}^k|^2 = 1,$$
$$|w_{1,2}^k|^2 + |w_{2,2}^k|^2 + \ldots + |w_{N_t,2}^k|^2 = 1,$$
$$\vdots$$
$$|w_{1,R}^k|^2 + |w_{2,R}^k|^2 + \ldots + |w_{N_t,R}^k|^2 = 1 \quad \text{Equation 5}$$

$$w_{1,1}^{k*}w_{1,2}^k + w_{2,1}^{k*}w_{2,2}^k + \ldots + w_{N_t,1}^{k*}w_{N_t,2}^k = 0,$$
$$w_{1,1}^{k*}w_{1,3}^k + w_{2,1}^{k*}w_{2,3}^k + \ldots + w_{N_t,1}^{k*}w_{N_t,3}^k = 0,$$
$$\vdots$$
$$w_{1,1}^{k*}w_{1,R}^k + w_{2,1}^{k*}w_{2,R}^k + \ldots + w_{N_t,1}^{k*}w_{N_t,R}^k = 0 \quad \text{Equation 6}$$

Next, an example of the generalized equation of a 2×2 phase shift based precoding matrix is provided and equations for satisfying the two constraints are obtained. Equation 7 shows a generalized equation of a phase shift based precoding matrix when the number of transmission antennas is 2 and a spatial multiplexing rate is 2.

$$P_{2 \times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix} \quad \text{Equation 7}$$

where, $\alpha_i$ and $\beta_i$ (i=1, 2) are real numbers, $\theta_i$ (i=1, 2, 3, 4) denotes a phase value, and k denotes a subcarrier index or specific subband index of an OFDM signal. In order to implement the precoding matrix with the unitary matrix, the power constraint of Equation 8 and the orthogonality constraint of Equation 9 should be satisfied.

$$|\alpha_1 e^{jk\theta_1}|^2 + |\beta_2 e^{jk\theta_3}|^2 = 1, \quad |\alpha_2 e^{jk\theta_4}|^2 + |\beta_1 e^{jk\theta_2}|^2 = 1 \quad \text{Equation 8}$$

$$(\alpha_1 e^{jk\theta_1})^* \beta_1 e^{jk\theta_2} + (\beta_2 e^{jk\theta_3})^* \alpha_2 e^{jk\theta_4} = 0 \quad \text{Equation 9}$$

where, the superscript * denotes a conjugate complex number. An example of a 2×2 phase shift based precoding matrix which satisfies Equations 7 to 9 is as follows.

$$P_{2\times 2}^k = \frac{1}{\sqrt{2}} \begin{pmatrix} 1 & e^{jk\theta_2} \\ e^{jk\theta_3} & 1 \end{pmatrix}$$ Equation 10 where, $\theta_2$ and $\theta_3$ have a relationship expressed by Equation 11 according to the orthogonality constraint.

$$k\theta_3 = -k\theta_2 + \pi$$ Equation 11

The precoding matrix may be stored in the memory of the transmitter and the receiver in a codebook form and the codebook may contain a variety of precoding matrixes generated using different finite $\theta_2$. The $\theta_2$ may be properly set according to the channel state and the existence of the feedback information. If the feedback information such as precoding matrix index is used, the $\theta_2$ are small in order to obtain frequency scheduling gain, and, if the feedback information is not available, the $\theta_2$ are large, thereby obtaining a high frequency diversity gain.

Figure 6:
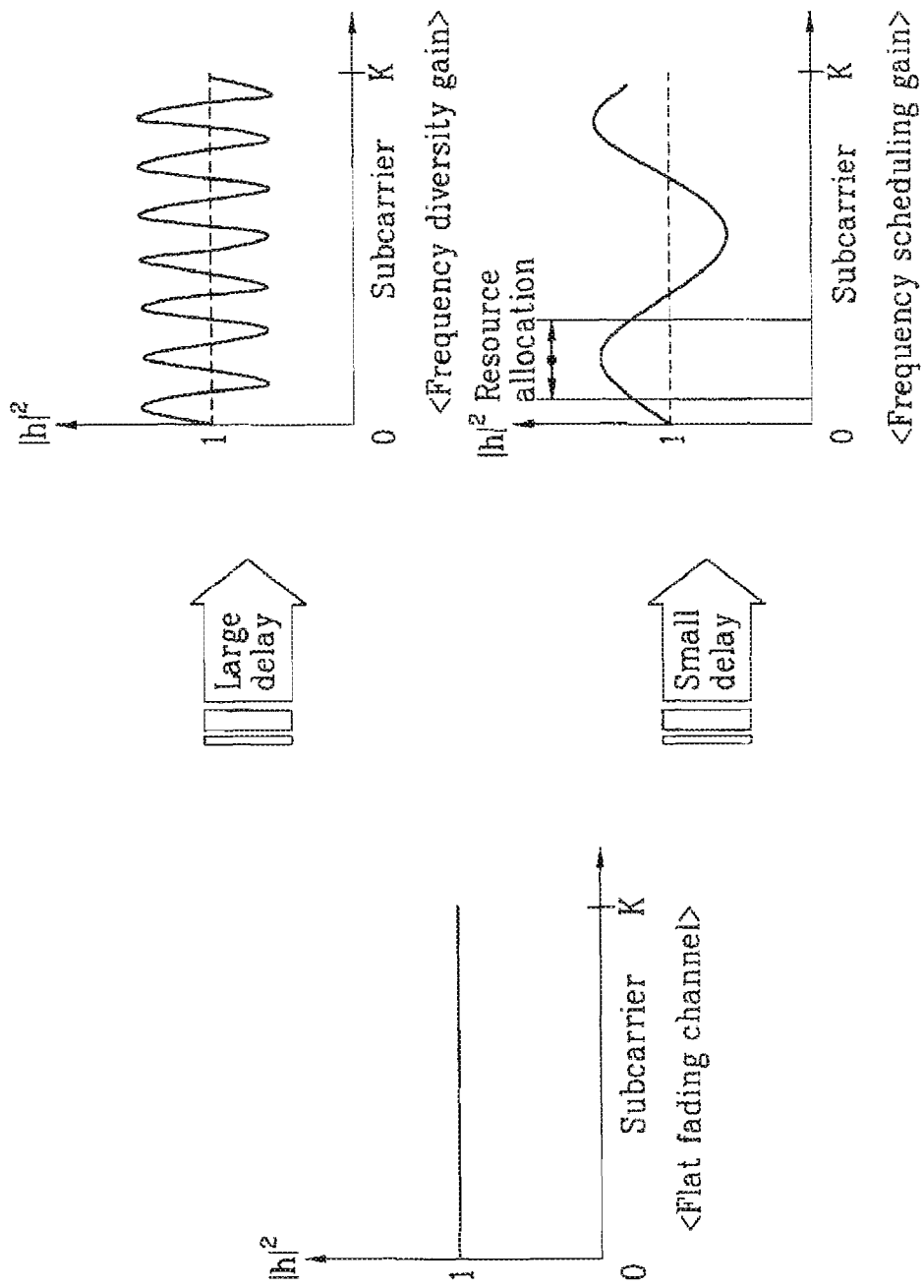
FIG. 6 is a graph showing examples of applying a phase shift based precoding and a phase shift diversity.

Meanwhile, a frequency diversity gain or a frequency scheduling gain can be obtained according to a delay sample value applied to the phase shift based precoding. FIG. 6 is a graph showing examples of applying a phase shift based precoding and a phase shift diversity according to the delay sample value.

As shown in FIG. 6, since a frequency-selective period is short if a large delay sample value (or a large cyclic delay) is used, frequency selectivity increases and a channel code exploit a frequency diversity gain easily. This is preferably used in an open loop system in which the channel value significantly varies with time and the reliability of the feedback information deteriorates.

If a small delay sample value is used, a portion in which the channel value increases and a portion in which the channel value decreases are included in a frequency-selective channel changed from a flat fading channel. Accordingly, the channel value of any subband (subcarrier region) of the OFDM symbol increases and the channel value of the other subcarrier region thereof decreases.

In the orthogonal frequency division multiple access (OFDMA) system which can admit a plurality of users, when a signal is transmitted to each user via the frequency band in which the channel value increases, a SNR may increase. Since the degree of allocation of the frequency band, in which the channel value increases, to each user may vary, the system obtains a multi-user scheduling gain.

The delay sample value (or cyclic delay) for the phase shift based precoding may be a value which is previously determined in the transmitter/receiver or a feedback information from the receiver. The spatial multiplexing rate R may be a value which is previously determined in the transmitter/receiver. Alternatively, the receiver periodically may check the channel state, calculate the spatial multiplexing rate, and feed back the spatial multiplexing rate to the transmitter or the transmitter may calculate and change the spatial multiplexing rate using the channel information from the receiver.

Embodiment 2

Generalized Phase Shift Diversity Matrix

The phase shift based precoding matrix described above may be expressed by Equation 12 with respect to a system in which the number of (physical or virtual) antennas $N_t$ ($N_t$ is a positive number of 2 or more) and the spatial multiplexing rate is R (R is a positive number of 1 or more). Since this equation is obtained by generalizing the conventional phase shift diversity, the multiple-antenna scheme expressed by Equation 12 is also called a generalized phase shift diversity (GPSD).

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$ Equation 12

$$= \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U_{N_t \times R}^k)$$

where, $GPSD_{N_t \times R}^k$ denotes a GPSD matrix of a $k^{th}$ subband or subcarrier of an MIMO-OFDM signal having a spatial multiplexing rate R and $N_t$ transmission (physical or virtual) antennas and $U_{N_t \times R}$ denotes a unitary matrix satisfying $U_{N_t \times R}^H \times U_{N_t \times R} = II_{R \times R}$ which is used to minimize the inter-symbol interference of the subcarrier corresponding to each antenna. In particular, in order to maintain the unitary matrix characteristics of a diagonal matrix for phase shift, it is preferable that $U_{N_t \times R}$ satisfies the condition of the unitary matrix. In Equation 12, a relationship between a phase angle $\theta_i$ (i= 1, ..., $N_t$) of a frequency domain and a delay time $\tau_i$ (i= 1, ..., $N_t$) of a time domain is expressed by Equation 13.

$$\theta_i = -2\pi/N_{fft} \cdot \tau_i$$ Equation 13 where, $N_{fft}$ denotes the number of subcarriers of the OFDM signal.

As a modified example of Equation 12, a GPSD matrix may be obtained as follows.

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$ Equation 14

$$= (U_{N_t \times R}^k) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix}$$

When the GPSD matrix of Equation 14 is obtained, the symbols of data streams (or the OFDM subcarriers) are shifted by an identical phase and thus the arrangement of the matrix is facilitated. That is, while the GPSD matrix of Equation 12 has rows having an identical phase, the GPSD matrix of Equation 14 has columns having an identical phase. The symbols of the subcarriers are shifted by the identical phase. When Equation 14 is extended, a GPSD matrix may be obtained by the following manner expressed by Equation 15.

$$GPSD_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$

$$= \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_{N_t} k} \end{pmatrix} (U_{N_t \times R}^k)$$

$$\begin{pmatrix} e^{j\theta'_1 k} & 0 & \cdots & 0 \\ 0 & e^{j\theta'_2 k} & \cdots & 0 \\ \vdots & \vdots & \ddots & 0 \\ 0 & 0 & 0 & e^{j\theta'_R k} \end{pmatrix}$$

Equation 15

According to Equation 15, since the rows and columns of the GPSD matrix have independent phases, a greater variety of frequency diversity gains can be obtained.

As an example of Equations 12, 14 and 15, the GPSD matrix of a system using 1-bit codebook and having two transmission antennas is expressed by Equation 16.

$$GPSD_{2 \times 2}^k = \begin{pmatrix} \alpha & \beta \\ \beta & -\alpha \end{pmatrix}, \alpha^2 + \beta^2 = 1 \quad \text{Equation 16}$$

In Equation 16, if the α is determined, the β is easily determined. Accordingly, the α may be set to have two values and the information about the α may be transmitted as a feedback codebook index. For example, upon the mutual agreement between the transmitter and the receiver, α is set to 0.2 if the feedback index is 0 and α is set to 0.8 if the feedback index is 1.

In Equations 12, 14 and 15, as an example of the unitary matrix $U_{N_t \times R}$, a predetermined precoding matrix for obtaining a SNR gain may be used. As such a precoding matrix, a Walsh Hadarmard matrix or a DFT matrix may be used. Among them, when the Walsh Hadarmard matrix is used, an example of the GPSD matrix of Equation 12 is expressed by Equation 17.

$$GPSD_{4 \times 4}^k = \quad \text{Equation 17}$$

$$\frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Equation 17 is obtained on the basis of the system having the spatial multiplexing rate of 4 and four transmission antennas. By properly reconfiguring the unitary matrix, a specific transmission antenna can be selected or the spatial multiplexing rate can be tuned.

Meanwhile, the unitary matrix $U_{N_t \times R}$ of Equations 12, 14 and 15 may be included in the transmitter and the receiver in the codebook form. In this case, the transmitter receives the index information of the codebook transmitted from the receiver, selects the unitary matrix of the index from the codebook included therein, and configures a phase shift based precoding matrix using one of the Equations 12, 14 and 15.

Examples of GPSD matrixes using 2×2 and 4×4 Walsh codes as the unitary matrix $U_{N_t \times R}$ of Equation 12, 14 and 15 are as follows:

TABLE 2

| 2 Tx | |
|---|---|
| Rate 1 | Rate 2 |
| $\frac{1}{\sqrt{2}} \begin{bmatrix} 1 \\ e^{j\theta_1 k} \end{bmatrix}$ | $\frac{1}{\sqrt{2}} \begin{bmatrix} 1 & 1 \\ e^{j\theta_1 k} & -e^{j\theta_1 k} \end{bmatrix}$ |

TABLE 3

| 4 Tx | | |
|---|---|---|
| Rate 1 | Rate 2 | Rate 4 |
| $\frac{1}{2} \begin{bmatrix} 1 \\ e^{j\theta_1 k} \\ e^{j\theta_2 k} \\ e^{j\theta_3 k} \end{bmatrix}$ | $\frac{1}{2} \begin{bmatrix} 1 & 1 \\ e^{j\theta_1 k} & -e^{j\theta_1 k} \\ e^{j\theta_2 k} & e^{j\theta_2 k} \\ e^{j\theta_3 k} & -e^{j\theta_3 k} \end{bmatrix}$ | $\frac{1}{2} \begin{bmatrix} 1 & 1 & 1 & 1 \\ e^{j\theta_1 k} & -e^{j\theta_1 k} & e^{j\theta_1 k} & -e^{j\theta_1 k} \\ e^{j\theta_2 k} & e^{j\theta_2 k} & -e^{j\theta_2 k} & -e^{j\theta_2 k} \\ e^{j\theta_3 k} & -e^{j\theta_3 k} & -e^{j\theta_3 k} & e^{j\theta_3 k} \end{bmatrix}$ |

Embodiment 3

Generalized Time-Varying Phase Shift Diversity

In the GPSD matrixes of Equations 12, 14 and 15, the phase angle $\theta_i$ of the diagonal matrix and/or the unitary matrix U may vary with time. For example, a time-varying GPSD of Equation 12 may be expressed by Equation 18.

$$GPSD_{N_t \times R}^k(t) = \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_{N_t}(t)k} \end{pmatrix} (U_{N_t \times R}(t)) \quad \text{Equation 18}$$

where, $GPSD_{N_t \times R}^k(t)$ denotes a GPSD matrix of a $k^{th}$ subcarrier or subband of an MIMO-OFDM having a spatial multiplexing rate of R and $N_t$ transmission (physical or virtual) antennas at a specific time t and $U_{N_t \times R}(t)$ denotes a unitary matrix (fourth matrix) for satisfying $U_{N_t \times R}^H \times U_{N_t \times R} = II_{R \times R}$ which is used to minimize the inter-symbol interference of the subcarrier corresponding to each antenna. In particular, in order to maintain the unitary matrix characteristics of a diagonal matrix (third matrix) for phase shift, it is preferable that $U_{N_t \times R}(t)$ satisfies the condition of the unitary matrix. In Equation 18, a relationship between a phase angle $\theta_i$ (i=1, ..., $N_t$) and a delay time $\tau_i$ (i=1, ..., $N_t$) is expressed by Equation 19.

$$\theta_i(t) = -2\pi/N_{fft} \cdot \tau_i(t) \quad \text{Equation 19}$$

where, $N_{fft}$ denotes the number of subcarriers of the OFDM signal.

As can be seen from Equations 18 and 19, the time delay sample value and the unitary matrix may vary with time. The unit of the time may be an OFDM symbol unit or a predetermined time unit.

Examples of the GPSD matrixes using 2×2 and 4×4 Walsh codes as the unitary matrix for obtaining the time-varying GPSD are shown in Tables 4 and 5.

TABLE 4

| 2 Tx | |
|---|---|
| Rate 1 | Rate 2 |
| $\begin{bmatrix} 1 \\ e^{j\theta_1(t)k} \end{bmatrix}$ | $\begin{bmatrix} 1 & 1 \\ e^{j\theta_1(t)k} & -e^{j\theta_1(t)k} \end{bmatrix}$ |

TABLE 5

| 4 Tx | | |
|---|---|---|
| Rate 1 | Rate 2 | Rate 4 |
| $\begin{bmatrix} 1 \\ e^{j\theta_1(t)k} \\ e^{j\theta_2(t)k} \\ e^{j\theta_3(t)k} \end{bmatrix}$ | $\begin{bmatrix} 1 & 1 \\ e^{j\theta_1(t)k} & -e^{j\theta_1(t)k} \\ e^{j\theta_2(t)k} & e^{j\theta_2(t)k} \\ e^{j\theta_3(t)k} & -e^{j\theta_3(t)k} \end{bmatrix}$ | $\begin{bmatrix} 1 & 1 & 1 & 1 \\ e^{j\theta_1(t)k} & -e^{j\theta_1(t)k} & e^{j\theta_1(t)k} & -e^{j\theta_1(t)k} \\ e^{j\theta_2(t)k} & e^{j\theta_2(t)k} & -e^{j\theta_2(t)k} & -e^{j\theta_2(t)k} \\ e^{j\theta_3(t)k} & -e^{j\theta_3(t)k} & -e^{j\theta_3(t)k} & e^{j\theta_3(t)k} \end{bmatrix}$ |

Although the time-varying GPSD matrix of Equation 12 is described in Embodiment 3, the diagonal matrix and the unitary matrix of Equations 14 and 15 may be used. Accordingly, although Equation 12 is described in the following embodiments, it is apparent to those skilled in the art that Equations 14 and 15 may be similarly extended and used.

Embodiment 4

Expansion of Generalized Phase Shift Diversity

In Embodiment 2, an extended GPSD matrix may be configured by adding the third matrix corresponding to the precoding matrix to the GPSD matrix composed of the diagonal matrix and the unitary matrix. This is expressed by Equation 20.

$$GPSD^k_{N_t \times R} = (\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (\mathbb{U}_{R \times R}) \quad \text{Equation 20}$$

The extended GPSD matrix is characterized in that a Nt×R precoding matrix P is added in front of the diagonal matrix of Equation 12 and the size of the diagonal matrix is employed on virtual antenna (Nt=R) domain, thus changed to R×R. The added precoding matrix $P_{N_t \times R}$ may be different from a specific frequency band or a specific subcarrier symbol and may be preferably set to a unitary matrix. It is possible to obtain a more optimized SNR gain by adding the precoding matrix $P_{N_t \times R}$ if the feedback information is available.

It is preferable that the transmitter and the receiver include a codebook containing a plurality of precoding matrixes P.

Meanwhile, in the extended GPSD matrix, at least one of the precoding matrix P, the phase angle θ of the diagonal matrix, and the unitary matrix U may vary with time. When the index of a next precoding matrix P is transmitted in the predetermined time unit or the predetermined subcarrier unit, a specific precoding matrix P corresponding to the index may be selected in a predetermined codebook.

The extended GPSD matrix according to the present embodiment may be expressed by Equation 21.

$$GPSD^k_{N_t \times R}(t) = \quad \text{Equation 21}$$

$$(\mathbb{P}_{N_t \times R}(t)) \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_R(t)k} \end{pmatrix} (\mathbb{U}_{R \times R}(t))$$

As examples of the extended GPSD matrix, a matrix of a multiple-antenna system having two transmission antennas and a matrix of a multiple-antenna system having four transmission antennas are expressed by Equations 22 and 23. A DFT matrix can be used as the unitary matrix U, but the present invention is not limited to this. Any matrix may be used as long as matrix satisfies the unit condition such as Walsh Hadarmard code.

$$GPSD^k_{2 \times 2}(t) = (\mathbb{P}_{2 \times 2}(t)) \begin{pmatrix} 1 & 0 \\ 0 & e^{j\theta(t)k} \end{pmatrix} (DFT_{2 \times 2}) \quad \text{Equation 22}$$

$$GPSD^k_{4 \times R}(t) = (\mathbb{P}_{4 \times R}(t)) \begin{pmatrix} 1 & 0 & \cdots & 0 \\ 0 & e^{j\theta(t)k} & \cdots & 0 \\ \vdots & \vdots & \ddots & \vdots \\ 0 & 0 & \cdots & e^{j(R-1)\theta(t)k} \end{pmatrix} (DFT_{4 \times R}) \quad \text{Equation 23}$$

Embodiment 5

Transmitter/Receiver for Performing Phase Shift Based Precoding

In general, a communication system includes a transmitter and a receiver. The transmitter and the receiver may be a transceiver which can perform a transmission function and a reception function. In order to clarify the description of the feedback, a device for transmitting data is called a transmitter and a device for feeding back data to the transmitter is called a receiver.

In a downlink, the transmitter may be a part of a base station and the receiver may be a part of a terminal. In an uplink, the transmitter may be a part of a terminal and the receiver may be a part of a base station. The base station may include a plurality of receivers and a plurality of transmitters and the terminal may include a plurality of receivers and a plurality of transmitters. In general, since the configuration of the receiver has the inverse functions of the functions of the transmitter, only the transmitter will be described in detail.

Figure 7:
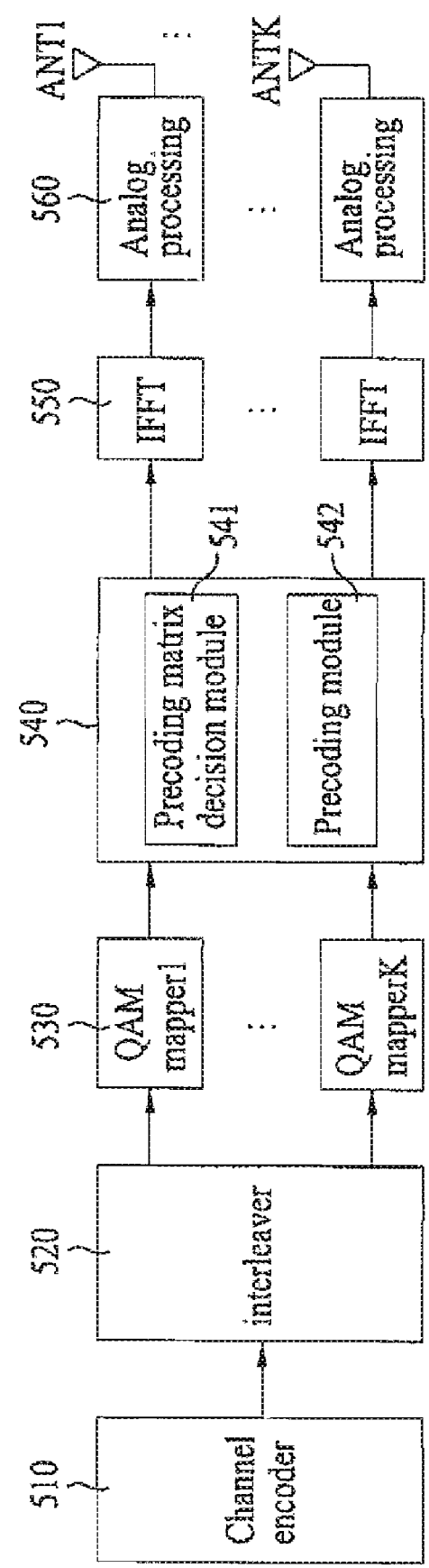
FIG. 7 is a block diagram showing an embodiment of a single code word (SCW) OFDM transmitter using a phase shift based precoding according to the embodiment of the present invention.
Figure 8:
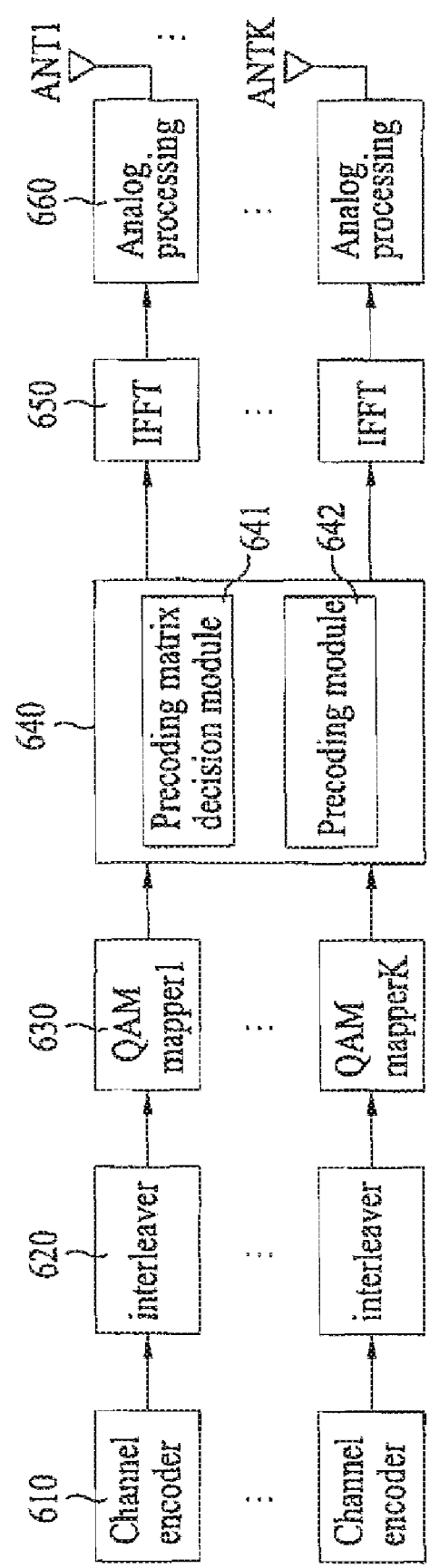
FIG. 8 is a block diagram showing an embodiment of a multiple code word (MCW) OFDM transmitter according to the embodiment of the present invention.

FIG. 7 is a block diagram showing an embodiment of a single code word (SCW) OFDM transmitter using a phase shift based precoding according to the embodiment of the present invention, and FIG. 8 is a block diagram showing an embodiment of a multiple code word (MCW) OFDM transmitter according to the embodiment of the present invention.

Figure 1:
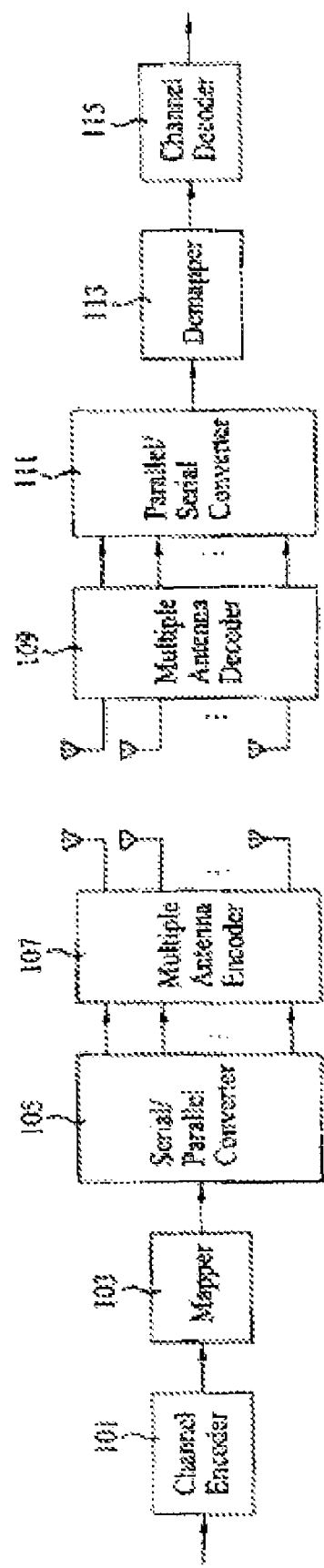
FIG. 1 is a block diagram showing an orthogonal frequency division multiplexing (OFDM) system including multiple transmission/reception antennas.
Figure 2:
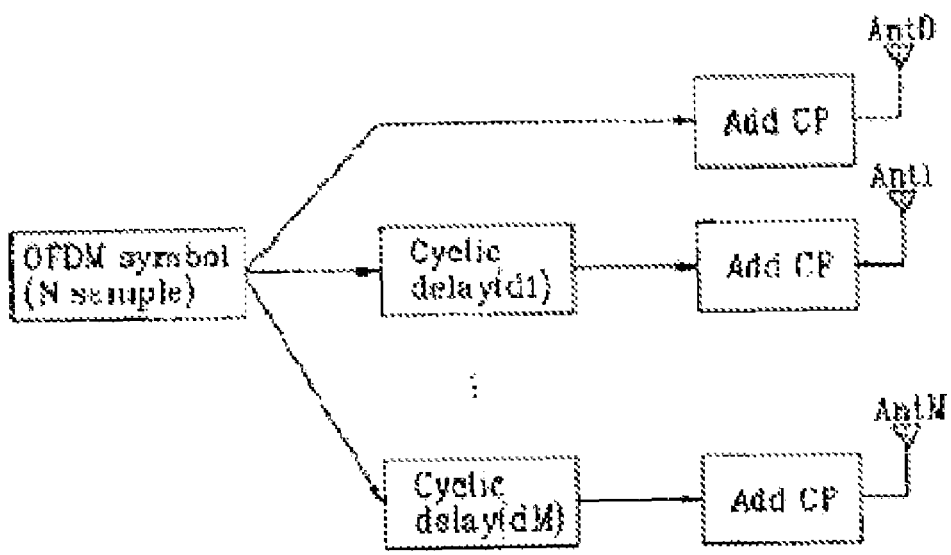
FIG. 2 is a block diagram showing a transmitter of a conventional multiple-antenna system using a cyclic delay diversity scheme.
Figure 3:
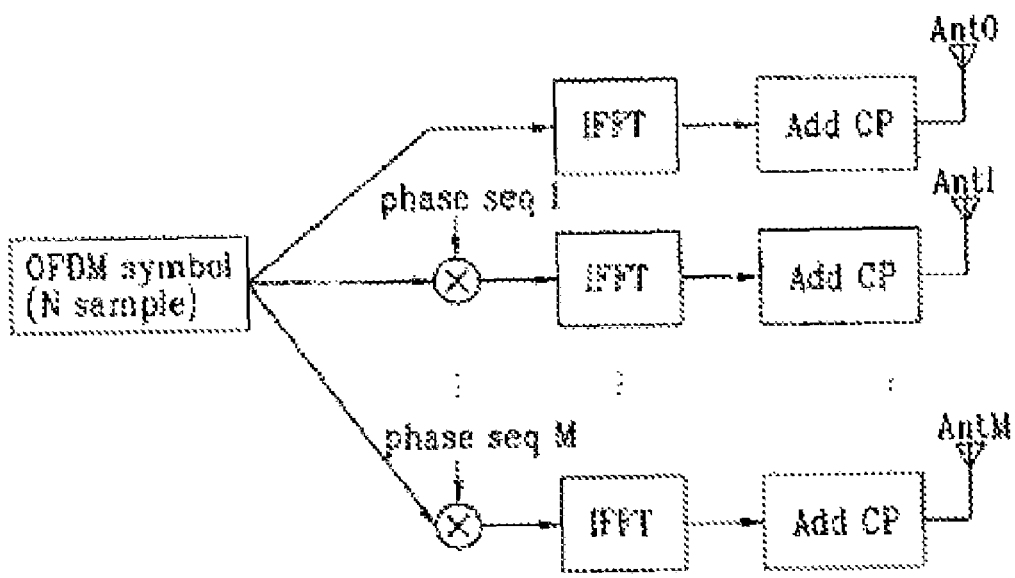
FIG. 3 is a block diagram showing a transmitter of a conventional multiple-antenna system using a phase shift diversity.
Figure 4:
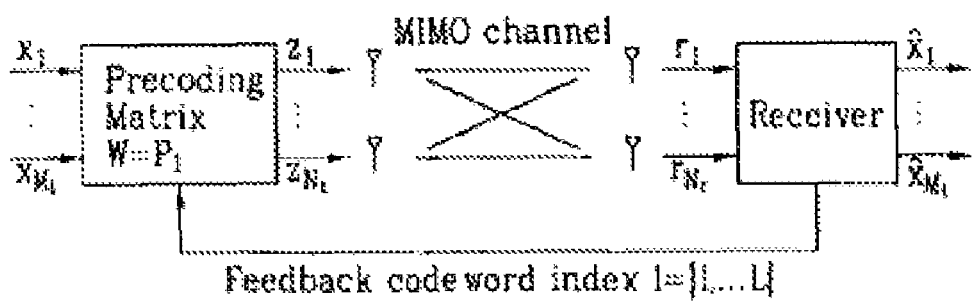
FIG. 4 is a block diagram showing a conventional multiple-antenna system using a precoding.

Since configurations including channel encoders 510 and 610, interleavers 520 and 620, inverse fast Fourier transforms (IFFTs) 550 and 650, and analog converters 560 and 660 are similar to those of FIG. 1, the description thereof will be omitted. Only predecoder 540 and 640 will be described in detail.

The predecoder 540 and 640 includes precoding matrix determining modules 541 and 641 and precoding modules 542 and 642.

The precoding matrix determining modules 541 and 641 determine phase shift based precoding matrixes by one of Equations 12, 14, 15, 20 and 21. Since the precoding matrix determining method is described in detail through Embodiments 2 to 4, the description thereof will be omitted. The phase shift based precoding matrix determined by one of Equations 12, 14, 15, 20, and 21 may be changed to the precoding matrix for eliminating the interference between the subcarriers, the phase angle of the diagonal matrix, and/or the unitary matrix according to the time, as expressed by Equation 18.

The precoding matrix determining modules 541 and 641 may select at least one of the precoding matrix and the unitary matrix on the basis of the feedback information from the receiver. Where, it is preferable that the feedback information contains a matrix index for a predetermined codebook.

The precoding modules 542 and 642 multiply the determined phase shift based precoding matrix by an OFDM symbol of a corresponding subcarrier to perform precoding.

According to the embodiment of the present invention, it is possible to implement efficient communication using a phase shift based precoding which solves the disadvantages of the conventional cyclic delay diversity, phase shift diversity, and precoding schemes and to further improve communication efficiency or simplify the design of the transmitter/receiver by generalizing or extending the phase shift based precoding.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting data from a transmitter to a receiver in a multiple-antenna system using a plurality of subcarriers, the method comprising:
   selecting a precoding matrix (P) from a codebook as a first part of a phase shift based precoding matrix;
   determining a diagonal matrix (D) for phase shift as a second part of the phase shift based precoding matrix;
   determining a unitary matrix (U) having a form of a Discrete Fourier Transform (DFT) matrix as a third part of the phase shift based precoding matrix; and
   performing precoding by multiplying the phase shift based precoding matrix by transmission symbol streams of a corresponding resource,
   wherein the phase shift based precoding matrix is acquired as P*D*U,
   wherein the precodinq matrix (P) is of size Nt-by-R,
   wherein the diagonal matrix (D) is of size R-by-R,
   wherein the unitary matrix (U) is of size R-by-R,
   wherein Nt is the number of transmission antennas, and
   wherein R is a spatial multiplexing rate.

2. The method according to claim 1, wherein the phase shift based precoding matrix is expressed by:

$$(\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (\mathbb{U}_{R \times R}),$$

wherein k denotes the index of the resource, $\theta_i (i=1, \ldots, R)$ denotes a phase angle, and R is the spatial multiplexing rate.

3. The method according to claim 1, wherein at least the precoding matrix, the diagonal matrix, or the unitary matrix varies with time.

4. A transceiver for transmitting data to a receiver in a multiple-antenna system using a plurality of subcarriers, the transceiver comprising:
   a precoding matrix determining module for:
      selecting a precoding matrix (P) from a codebook as a first part of a phase shift based precoding matrix;
      determining a diagonal matrix (D) for phase shift as a second part of the phase shift based precoding matrix;
      determining a unitary matrix having a form of a Discrete Fourier Transform (DFT) matrix as a third part of the phase shift based precoding matrix; and
      determining the phase shift based precoding matrix P*D*U; and
   a precoding module for multiplying the determined phase shift based precoding matrix by transmission symbol streams of a corresponding resource,
   wherein the precoding matrix (P) is of size Nt-by-R,
   wherein the diagonal matrix (D) is of size R-by-R,
   wherein the unitary matrix (U) is of size R-by-R,
   wherein Nt is the number of transmission antennas, and
   wherein R is a spatial multiplexing rate.

5. The transceiver according to claim 4, wherein the phase shift based precoding matrix is expressed by:

$$(\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (\mathbb{U}_{R \times R}),$$

wherein k denotes the index of the resource, $\theta_i(i=1, \ldots, R)$ denotes a phase angle, and R is the spatial multiplexing rate.

6. The transceiver according to claim 4, wherein at least the precoding matrix, the diagonal matrix, or the unitary matrix varies with time.

7. The transceiver according to claim 4, wherein the precoding matrix is selected on the basis of feedback information from the receiver.

8. The transceiver according to claim 7, wherein the feedback information contains a matrix index for the codebook.

9. A method of receiving data in a receiver from a transmitter in a multiple-antenna system using a plurality of subcarriers, the method comprising:
   receiving a signal transmitted from the transmitter via $N_t$ transmission antennas;
   selecting a precoding matrix (P) from a codebook as a first part of a phase shift based precoding matrix;
   determining a diagonal matrix (D) for phase shift as a second part of the phase shift based precoding matrix;
   determining a unitary matrix (U) having a form of a Discrete Fourier Transform (DFT) matrix as a third part of the phase shift based precoding matrix; and
   performing an inverse function of a precoding performed at the transmitter using the phase shift based precoding matrix, wherein the phase shift based precoding matrix is acquired as P*D*U
   wherein the precoding matrix (P) is of size Nt-by-R,
   wherein the diagonal matrix (D) is of size R-by-R,
   wherein the unitary matrix (U) is of size R-by-R,
   wherein Nt is the number of transmission antennas, and
   wherein R is a spatial multiplexing rate.

10. The method according to claim 9, wherein the phase shift based precoding matrix is expressed by:

$$(\mathbb{P}_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & 0 & e^{j\theta_R k} \end{pmatrix} (\mathbb{U}_{R \times R}),$$

wherein k denotes the index of the resource, $\theta_i (i=1, \ldots, R)$ denotes a phase angle, and R is the spatial multiplexing rate.

11. The method according to claim 9, wherein at least the precoding matrix, the diagonal matrix, or the unitary matrix varies with time.

* * * * *